United States Patent
Chen et al.

(10) Patent No.: US 11,863,386 B2
(45) Date of Patent: Jan. 2, 2024

(54) MOBILE DEVICE MANAGEMENT METHOD AND DEVICE

(71) Applicant: Huawei Technologies Co., Ltd., Shenzhen (CN)

(72) Inventors: Xiaodong Chen, Beijing (CN); Zhenqi Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 26 days.

(21) Appl. No.: 17/776,528

(22) PCT Filed: Nov. 13, 2020

(86) PCT No.: PCT/CN2020/128697
§ 371 (c)(1),
(2) Date: May 12, 2022

(87) PCT Pub. No.: WO2021/093855
PCT Pub. Date: May 20, 2021

(65) Prior Publication Data
US 2022/0385531 A1  Dec. 1, 2022

(30) Foreign Application Priority Data

Nov. 13, 2019 (CN) .......................... 201911108641.8

(51) Int. Cl.
*H04L 41/082* (2022.01)
*H04W 12/37* (2021.01)
(Continued)

(52) U.S. Cl.
CPC ........ *H04L 41/082* (2013.01); *H04L 41/0846* (2013.01); *H04L 41/0883* (2013.01);
(Continued)

(58) Field of Classification Search
CPC ....... H04L 41/082; H04L 63/20; H04L 67/34; H04L 67/56–59; H04W 4/50;
(Continued)

(56) References Cited

U.S. PATENT DOCUMENTS

| 8,494,485 B1* | 7/2013 | Broch | ................ H04W 12/37 455/410 |
| 9,369,433 B1* | 6/2016 | Paul | .................... H04L 63/1433 |

(Continued)

FOREIGN PATENT DOCUMENTS

| CN | 1543251 A | 11/2004 |
| CN | 1902608 A | 1/2007 |

(Continued)

OTHER PUBLICATIONS

Pan Jia et al., "Research and Implementation of Enterprise Mobile Management Based on MDM Protocol," Software Industry and Engineering, No. 41, Issue 5, Total 5 pages (2016). With an English Abstract.

(Continued)

*Primary Examiner* — Brendan Y Higa
(74) *Attorney, Agent, or Firm* — Leydig, Voit & Mayer, Ltd.

(57) ABSTRACT

A mobile device management method includes: a first electronic device sends a request message including an identifier of at least one second electronic device to a first server. The first electronic device receives a DM service APP from the first server and installs the DM service APP. After the DM service APP is installed, the first electronic device can provide the MDM service. The first electronic device provides the MDM service for the second electronic device, to implement management and device system upgrade of the second electronic device.

12 Claims, 7 Drawing Sheets

(51) Int. Cl.
  *H04L 41/084* (2022.01)
  *H04L 41/08* (2022.01)
  *H04W 8/24* (2009.01)
  *H04L 41/22* (2022.01)
  *H04L 67/00* (2022.01)

(52) U.S. Cl.
  CPC .............. *H04L 41/22* (2013.01); *H04L 67/34* (2013.01); *H04W 12/37* (2021.01); *H04W 8/245* (2013.01)

(58) Field of Classification Search
  CPC ........... H04W 12/37; H04W 24/02–04; H04W 92/16–18; G06F 8/60–66
  See application file for complete search history.

(56) References Cited

U.S. PATENT DOCUMENTS

| | | | |
|---|---|---|---|
| 9,672,338 B1* | 6/2017 | Kim | ........... G06F 21/10 |
| 9,894,099 B1* | 2/2018 | Jacobsen | ............ H04W 12/128 |
| 9,954,728 B2* | 4/2018 | Debate | ............. G06F 16/90335 |
| 2008/0072043 A1 | 3/2008 | Lee | |
| 2008/0130639 A1* | 6/2008 | Costa-Requena | ....... H04L 67/51 370/389 |
| 2008/0160983 A1* | 7/2008 | Poplett | ..................... G06F 8/61 455/419 |
| 2010/0199333 A1 | 8/2010 | Keum et al. | |
| 2011/0238807 A1 | 9/2011 | Lee et al. | |
| 2012/0179802 A1* | 7/2012 | Narasimhan | ........ H04L 41/0806 709/223 |
| 2014/0298403 A1 | 10/2014 | Qureshi | |
| 2015/0188777 A1* | 7/2015 | Frost | ....................... H04L 67/34 709/223 |
| 2015/0215772 A1 | 7/2015 | Gattu et al. | |
| 2015/0244741 A1 | 8/2015 | Sinha et al. | |
| 2015/0264052 A1 | 9/2015 | Cho et al. | |
| 2015/0278488 A1* | 10/2015 | Batchu | ................ G06F 21/6218 726/29 |
| 2015/0350248 A1* | 12/2015 | Nagarajan | ........... G06F 9/45558 726/1 |
| 2016/0255117 A1* | 9/2016 | Sinha | .................... G06F 21/572 726/1 |
| 2018/0309832 A1 | 10/2018 | Jain et al. | |
| 2020/0204551 A1* | 6/2020 | Singh | ................. H04L 63/0218 |

FOREIGN PATENT DOCUMENTS

| | | |
|---|---|---|
| CN | 101325509 A | 12/2008 |
| CN | 101421978 A | 4/2009 |
| CN | 102265652 A | 11/2011 |
| CN | 103069854 A | 4/2013 |
| CN | 104754582 A | 7/2015 |
| CN | 105025467 A | 11/2015 |
| CN | 107395706 A | 11/2017 |
| CN | 110149634 A | 8/2019 |
| CN | 110324193 A | 10/2019 |
| CN | 111093183 A | 5/2020 |
| EP | 2996401 A1 | 3/2016 |
| EP | 2467969 B1 | 3/2019 |
| KR | 20070107999 A | 11/2007 |
| KR | 20090130744 A | 12/2009 |

OTHER PUBLICATIONS

"Mobile device management," Wikipedia, XP055553423, Total 6 pages, Nov. 2, 2016, Retrieved from the Internet: URL: https://en.wikipedia.org/w/index.php?title=Mobile_device_management&oldid=747538478 (retrieved on Feb. 7, 2019).

* cited by examiner

MOBILE DEVICE MANAGEMENT METHOD AND DEVICE

CROSS-REFERENCE TO RELATED APPLICATIONS

This application is a national stage of International Application No. PCT/CN2020/128697, filed on Nov. 13, 2020, which claims priority to Chinese Patent Application No. 201911108641.8, filed on Nov. 13, 2019. Both of the aforementioned applications are hereby incorporated by reference in their entireties.

TECHNICAL FIELD

This application relates to the field of electronic devices, and in particular, to a mobile device management method and a device.

BACKGROUND

More mobile devices such as mobile phones and tablets are used in enterprises. To be specific, enterprise employees can use the mobile devices to access enterprise intranet resources. However, using the mobile devices to access the enterprise intranet resources poses great threats to enterprise information security. Accordingly, mobile device management (MDM) emerges. MDM is a basic support solution for enterprises to implement a mobility policy, and is intended to perform unified security management on a large quantity of various mobile devices used in the enterprises. For example, the enterprises can implement device system upgrade and device configuration management of the mobile devices based on MDM.

Currently, mobile device management is implemented based on a C-S (client-server) deployment mode. To be specific, a to-be-managed mobile device needs to be connected to an MDM server through the Internet. The MDM server is deployed on a network side. An MDM service provider can provide device management services for the enterprises through the MDM server. With these services, the enterprises can upgrade device systems of the mobile devices, and centrally manage and deploy device registration, device networking, device users, device content, and the like in batches. In addition, the MDM service provider further provides an agent (or referred to as a client) on a mobile device side, and the agent is used to perform encrypted communication between the mobile device and the MDM server, complete device registration by using a corresponding service provided by the MDM server, and invoke a device management interface based on instructions delivered by the MDM server for device management. The MDM service provider further provides a management port for an enterprise information technology (IT), to complete, based on browsers, planning grouping policies for users, devices, and roles, and manage and view specific devices.

It can be seen that, for mobile device management implemented based on the C-S deployment mode, a to-be-managed mobile device needs to be connected to a network, so that an enterprise can implement device system upgrade and management of the to-be-managed mobile device. As a result, management and device system upgrade of some devices that are of inconvenience in being connected to a network cannot be implemented.

SUMMARY

Embodiments of this application provide a mobile device management method and a device, to resolve a problem that management and device system upgrade of an electronic device that is of inconvenience in being connected to a network cannot be implemented.

According to a first aspect, an embodiment of this application provides a mobile device management method. The method may include: A first electronic device sends a request message to a first server. The request message may include an identifier of at least one second electronic device, and the request message is used to apply for deployment of an MDM service. The MDM service is used for management and device system upgrade of the second electronic device. The first electronic device receives a device management (DM) service application (APP) from the first server, and installs the DM service APP. After the DM service APP is installed, the first electronic device can provide the MDM service. The first electronic device establishes a wireless peer-to-peer (P2P) connection to the second electronic device, or the first electronic device and the second electronic device access a same local area network. The first electronic device provides the MDM service for the second electronic device, to implement management and device system upgrade of the second electronic device.

According to the mobile device management method provided in this embodiment of this application, an MDM service is deployed on an electronic device, so that an enterprise can implement management and device system upgrade of a to-be-managed electronic device in a local area network or a near field environment by using the electronic device on which the MDM service is deployed, without connecting the to-be-managed electronic device to a network. This resolves a problem that management and device system upgrade of an electronic device that is of inconvenience in being connected to a network cannot be implemented. In addition, the to-be-managed electronic devices do not need to be separately connected to the Internet to download related data, which saves traffic and reduces service costs. In addition, the MDM service is deployed on the electronic device to implement device management and device system upgrade, without purchasing a service provided by an MDM service provider, which reduces device management costs. After the MDM service is deployed on the electronic device, because the electronic device and the to-be-managed electronic device do not need to be connected to the Internet, an enterprise that cannot use a public network to perform system upgrade (OTA upgrade) can implement device system upgrade and other management by using the solution provided in this embodiment.

In a possible implementation, the request message may further include authorized login account information, and the identifier of the at least one second electronic device corresponds to the authorized login account information. In this way, a carried authorized login account information helps a server verify validity of a device that requests to deploy an MDM service, to ensure security of enterprise device management, and reduce risks of enterprise data leakage.

In another possible implementation, before that the first electronic device receives a DM service APP from the first server, and installs the DM service APP, the method may further include: The first electronic device receives a service policy for the second electronic device from the first server. The first electronic device displays a setting interface according to the service policy for the second electronic device. The first electronic device receives management and function configuration performed by a user for the second electronic device on the setting interface. The first electronic device sends configuration information to the first server.

The configuration information includes a configuration parameter obtained after the user performs management and function configuration for the second electronic device. According to a received service policy, the electronic device may display a corresponding setting interface for the user to perform corresponding management and function configuration.

In another possible implementation, before that the first electronic device installs the DM service APP, the method may further include: The first electronic device verifies a signature of the DM service APP by using a preset public key of the first server, and decrypts the DM service APP by using a private key of the first electronic device. In this way, the DM service APP is obtained by verifying the signature of the DM service APP and decrypting encrypted data. It can be seen that only the first electronic device (or a master device) can successfully decrypt and use the DM service APP, to further ensure security of enterprise device management, and reduce the risks of enterprise data leakage.

According to a second aspect, an embodiment of this application provides a mobile device management method. The method may include: A first server receives a request message from a first electronic device. The request message includes an identifier of at least one second electronic device, and the request message is used to apply for deployment of an MDM service. The MDM service is used for management and device system upgrade of the second electronic device. The first server accesses a second server based on the identifier of the at least one second electronic device, to obtain a DM service APP. The DM service APP is used by the first electronic device to provide the MDM service. The first server sends the DM service APP to the first electronic device.

According to the mobile device management method provided in this embodiment of this application, an MDM service is deployed on an electronic device, so that an enterprise can implement management and device system upgrade of a to-be-managed electronic device in a local area network or a near field environment by using the electronic device on which the MDM service is deployed, without connecting the to-be-managed electronic device to a network. This resolves a problem that management and device system upgrade of an electronic device that is of inconvenience in being connected to a network cannot be implemented. In addition, the MDM service is deployed on the electronic device to implement device management and device system upgrade, without purchasing a service provided by an MDM service provider, which reduces device management costs. After the MDM service is deployed on the electronic device, because the electronic device and the to-be-managed electronic device do not need to be connected to the Internet, an enterprise that cannot use a public network to perform system upgrade (OTA upgrade) can implement device system upgrade and other management by using the solution provided in this embodiment.

In a possible implementation, the request message may further include authorized login account information, and the identifier of the at least one second electronic device corresponds to the authorized login account information. The method may further include: The first server performs account verification on the authorized login account information. That the first server accesses a second server based on the identifier of the at least one second electronic device, to obtain a device management DM service application APP includes: After the account verification performed on the authorized login account information succeeds, the first server accesses the second server based on the identifier of the at least one second electronic device, to obtain the DM service APP. In this way, a server verifies, based on authorized login account information carried in a request message, validity of a device that requests to deploy an MDM service, to ensure security of enterprise device management, and reduce risks of enterprise data leakage.

In another possible implementation, that the first server accesses a second server based on the identifier of the at least one second electronic device, to obtain a device management DM service application APP may include: The first server accesses the second server based on the identifier of the at least one second electronic device, to obtain a service policy for the at least one second electronic device. The first server sends the service policy for the at least one second electronic device to the first electronic device, so that a user performs management and function configuration on the at least one second electronic device. The first server receives configuration information sent by the first electronic device. The configuration information includes a configuration parameter obtained after the user performs management and function configuration on the at least one second electronic device. The first server sends the configuration information to the second server, so that the second server generates the DM service APP. The first server receives the DM service APP from the second server. In this way, the server returns a corresponding service policy to the electronic device, so that the electronic device displays a corresponding setting interface for the user to perform corresponding management and function configuration.

In another possible implementation, that the first server accesses the second server based on the identifier of the at least one second electronic device, to obtain a service policy for the at least one second electronic device may include: The first server obtains a device model of the at least one second electronic device based on the identifier of the at least one second electronic device. The first server accesses the second server based on the device model of the at least one second electronic device, to obtain the service policy for the at least one second electronic device.

In another possible implementation, before that the first server sends the DM service APP to the first electronic device, the method may further include: The first server signs the DM service APP by using a private key of the first server, and encrypts the DM service APP by using an encryption key derived from a public key of the first electronic device. In this way, the DM service APP is signed and encrypted, so that the DM service APP can be successfully decrypted and used only on the first electronic device (or a master device), to further ensure the security of enterprise device management, and reduce the risks of enterprise data leakage.

According to a third aspect, an embodiment of this application provides an electronic device. The electronic device may include a processor and a memory. The processor is coupled to the memory. The memory is configured to store computer program code. The computer program code includes computer instructions. When the computer instructions are executed by the electronic device, the electronic device is enabled to perform the mobile device management method according to any one of the first aspect or the possible implementations of the first aspect.

Specifically, when the computer instructions are executed by the electronic device, the electronic device is enabled to perform the following operations: sending a request message to a first server, where the request message may include an identifier of at least one second electronic device, the request message is used to apply for deployment of an MDM service, and the MDM service is used for management and device system upgrade of the second electronic device; receiving a DM service APP from the first server, and installing the DM service APP, where after the DM service APP is installed, the electronic device can provide the MDM service; establishing a wireless P2P connection to the second electronic device, or accessing a same local area network with the second electronic device; and providing the MDM service for the second electronic device, to implement management and device system upgrade of the second electronic device.

In a possible implementation, the request message may further include authorized login account information, and the identifier of the at least one second electronic device corresponds to the authorized login account information.

In another possible implementation, when the computer instructions are executed by the electronic device, the electronic device is further enabled to perform the following operations: receiving a service policy for the second electronic device from the first server; displaying a setting interface according to the service policy for the second electronic device; receiving management and function configuration performed by a user for the second electronic device on the setting interface; and sending configuration information to the first server, where the configuration information includes a configuration parameter obtained after the user performs management and function configuration for the second electronic device.

In another possible implementation, when the computer instructions are executed by the electronic device, the electronic device is further enabled to perform the following operations: verifying a signature of the DM service APP by using a preset public key of the first server, and decrypting the DM service APP by using a private key of the electronic device.

According to a fourth aspect, an embodiment of this application provides a server. The server may include a processor and a memory. The processor is coupled to the memory. The memory is configured to store computer program code. The computer program code includes computer instructions. When the computer instructions are executed by the server, the server is enabled to perform the mobile device management method according to any one of the second aspect or the possible implementations of the second aspect.

Specifically, when the computer instructions are executed by the server, the server is enabled to perform the following operations: receiving a request message from a first electronic device, where the request message includes an identifier of at least one second electronic device, the request message is used to apply for deployment of an MDM service, and the MDM service is used for management and device system upgrade of the second electronic device; accessing a second server based on the identifier of the at least one second electronic device, to obtain a DM service APP, where the DM service APP is used by the first electronic device to provide the MDM service; and sending the DM service APP to the first electronic device.

In a possible implementation, the request message may further include authorized login account information, and the identifier of the at least one second electronic device corresponds to the authorized login account information. When the computer instructions are executed by the server, the server is further enabled to perform the following operation: performing account verification on the authorized login account information. The accessing a second server based on the identifier of the at least one second electronic device, to obtain a DM service APP includes: after the account verification performed on the authorized login account information succeeds, accessing the second server based on the identifier of the at least one second electronic device, to obtain the DM service APP.

In another possible implementation, the accessing a second server based on the identifier of the at least one second electronic device, to obtain a device management DM service application APP may include: accessing the second server based on the identifier of the at least one second electronic device, to obtain a service policy for the at least one second electronic device; sending the service policy for the at least one second electronic device to the first electronic device, so that a user performs management and function configuration on the at least one second electronic device; receiving configuration information sent by the first electronic device, where the configuration information includes a configuration parameter obtained after the user performs management and function configuration on the at least one second electronic device; sending the configuration information to the second server, so that the second server generates the DM service APP; and receiving the DM service APP from the second server.

In another possible implementation, the accessing the second server based on the identifier of the at least one second electronic device, to obtain a service policy for the at least one second electronic device may include: obtaining a device model of the at least one second electronic device based on the identifier of the at least one second electronic device; and accessing the second server based on the device model of the at least one second electronic device, to obtain the service policy for the at least one second electronic device.

In another possible implementation, when the computer instructions are executed by the server, the server is further enabled to perform the following operations: signing the DM service APP by using a private key of the first server, and encrypting the DM service APP by using an encryption key derived from a public key of the first electronic device.

According to a fifth aspect, an embodiment of this application provides a computer-readable storage medium, including computer software instructions. When the computer software instructions are run on an electronic device, the electronic device is enabled to perform the mobile device management method according to any one of the first aspect or the possible implementations of the first aspect.

According to a sixth aspect, an embodiment of this application provides a computer program product. When the computer program product runs on a computer, the computer is enabled to perform the mobile device management method according to any one of the first aspect or the possible implementations of the first aspect.

According to a seventh aspect, an embodiment of this application provides a computer-readable storage medium, including computer software instructions. When the computer software instructions are run on a server, the server is enabled to perform the mobile device management method according to any one of the second aspect or the possible implementations of the second aspect.

According to an eighth aspect, an embodiment of this application provides a computer program product. When the computer program product runs on a computer, the computer is enabled to perform the mobile device management method according to any one of the second aspect or the possible implementations of the second aspect.

It should be understood that descriptions of technical features, technical solutions, beneficial effects, or similar words in this application do not imply that all features and advantages are limited to any individual embodiment. On the contrary, it may be understood that the descriptions of the features or the beneficial effects mean that at least one embodiment includes a specific technical feature, technical solution, or beneficial effect. Therefore, the descriptions of the technical features, the technical solutions, or the beneficial effects in this specification are not necessarily limited to one respective embodiment. Further, the technical features, the technical solutions, and the beneficial effects described in embodiments may be combined in any proper manner. A person skilled in the art understands that an embodiment may be implemented without one or more specific technical features, technical solutions, or beneficial effects in a specific embodiment. In other embodiments, additional technical features and beneficial effects may be further identified in a specific embodiment.

DESCRIPTION OF EMBODIMENTS

Terms "first" and "second" mentioned below are merely intended for a purpose of description, and shall not be understood as an indication or implication of relative importance or implicit indication of a quantity of indicated technical features. Therefore, a feature limited by "first" or "second" may explicitly indicate or implicitly include one or more such features.

In descriptions of embodiments of this application, words such as "example" or "for example" are used to represent giving an example, an illustration, or a description. Any embodiment or design scheme described as an "example" or with "for example" in embodiments of this application should not be explained as being more preferred or having more advantages than another embodiment or design scheme. Exactly, use of the words such as "example" or "for example" is intended to present a related concept in a specific manner.

An influx of electronic devices such as mobile phones and tablets poses great challenges to enterprise IT management. Currently, mobile device management (MDM) is implemented based on a C-S deployment mode. In this deployment mode, a to-be-managed electronic device needs to be connected to a network. However, this causes a result that management and device system upgrade of an electronic device that is of inconvenience in being connected to a network cannot be implemented. In addition, an MDM service provider generally charges for a single device (namely, one to-be-managed electronic device) per month. As a result, an enterprise usually needs to pay a high fee when using a service provided by the MDM service provider to implement management of a large quantity of mobile devices.

Embodiments of this application provide a mobile device management method, so that an MDM service can be deployed on an electronic device. An enterprise can implement management and device system upgrade of a to-be-managed electronic device in a local area network or a near field environment by using the electronic device on which the MDM service is deployed, without connecting the to-be-managed electronic device to a network. This resolves a problem that management and device system upgrade of an electronic device that is of inconvenience in being connected to a network cannot be implemented. In addition, the MDM service is deployed on the electronic device to implement device management and device system upgrade, without purchasing a service provided by an MDM service provider, which reduces device management costs.

The following describes implementations of embodiments of this application in detail with reference to the accompanying drawings.

Figure 1:
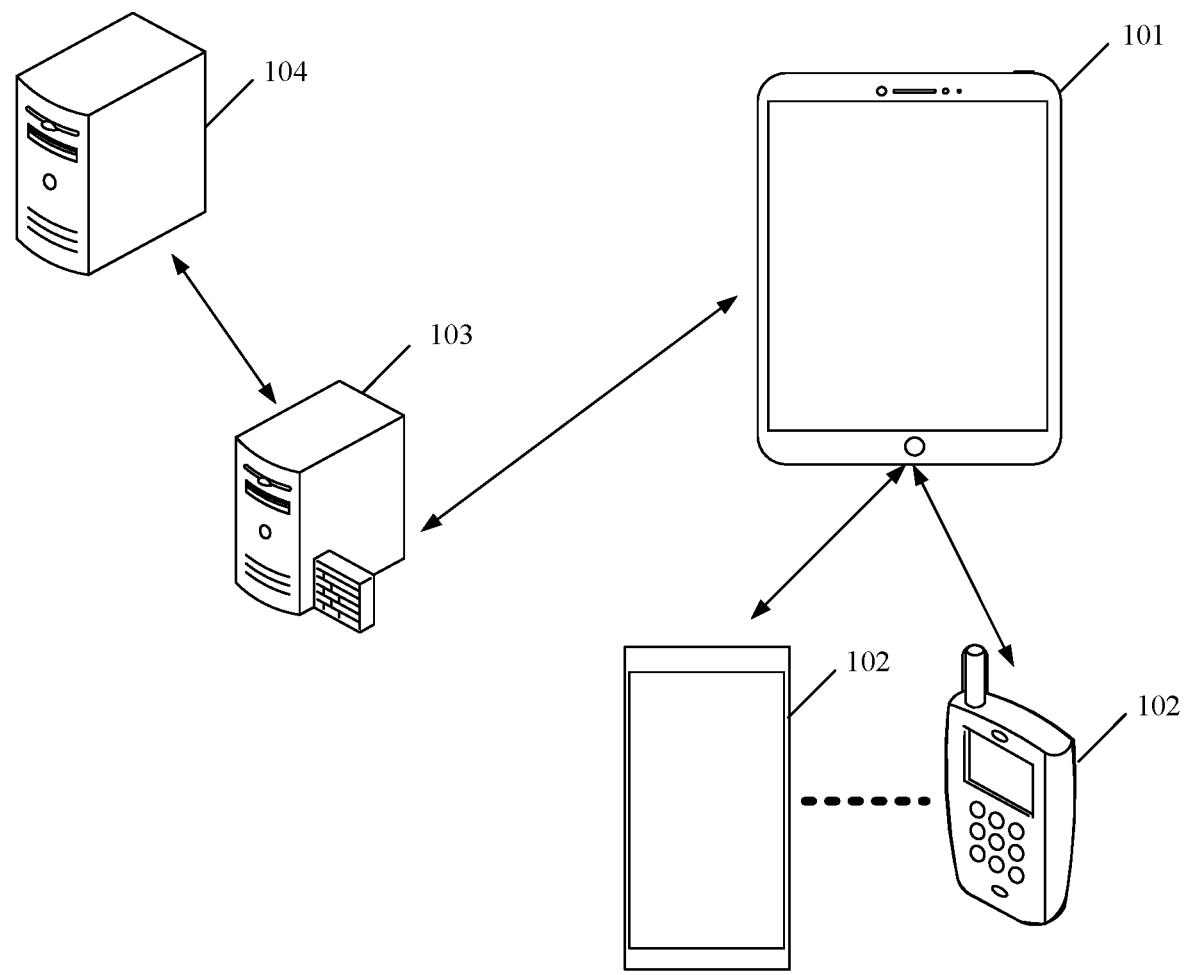
FIG. 1 is a schematic diagram of a composition of a mobile device management system according to an embodiment of this application.

FIG. 1 is a schematic diagram of a composition of a mobile device management system according to an embodiment of this application. As shown in FIG. 1, the mobile device management system may include at least a first electronic device 101, at least one second electronic device 102, a first server 103, and a second server 104.

The first electronic device 101 may serve as a master device, and request, by accessing the first server 103, the second server 104 to deploy an MDM service for the first electronic device 101. The at least one second electronic device 102 is a to-be-managed device.

After the first electronic device 101 successfully applies for deployment of the MDM service, when the at least one second electronic device 102 and the first electronic device 101 are in a same local area network or establish a wireless peer-to-peer (P2P) connection, the first electronic device 101 can provide the MDM service, for example, that may include a management service and a system upgrade service, for the second electronic device 102, to implement management and device system upgrade of the least one second electronic device 102. In this embodiment, management implemented by the first electronic device 101 may include at least one of the following: device management, network management, security management, email management, content management, application management, and the like.

The first server 103 may be a server disposed on the Internet, and provides a service interface that can be used to access an extranet for an electronic device on an enterprise intranet, for example, the first electronic device 101. The first server 103 may be provided by a device vendor, and is configured to provide a value-added service for a device. For example, a vendor that produces the second electronic device 102, or produces the first electronic device 101 and the second electronic device 102 provides the first server 103. In this embodiment, the first server 103 may be referred to as a device management portal (DM portal), or a device management service portal (DM service portal). The DM portal may be a cloud service purchased by an enterprise.

The second server 104 may be a server that is deployed on the Internet and that is configured to provide a device management (DM) service. The second server 104 may generate a corresponding DM service application (APP) for the first electronic device 101 by interacting with the first server 103, and deliver the DM service application to the first electronic device 101 through the first server 103, to implement deployment of the MDM service on the first electronic device 101.

In some embodiments, the at least one second electronic device 102 may be devices that are purchased by an enterprise in batches and that are used by employees of the enterprise. For example, in this embodiment of this application, the first electronic device 101 and the second electronic device 102 each may be a mobile phone, a tablet, a desktop computer, a laptop, a handheld computer, a notebook computer, an ultra-mobile personal computer (UMPC), a netbook, a wearable device, for example, a smartwatch, and a device, for example, a cellular phone, a personal digital assistant (PDA), or an augmented reality (AR)/virtual reality (VR) device. Specific forms of the first electronic device 101 and the second electronic device 102 are not specially limited in this embodiment of this application. In addition, in some embodiments, the first electronic device 101 and the second electronic device 102 may be electronic devices of a same type. For example, both the first electronic device 101 and the second electronic device 102 are mobile phones. In some other embodiments, the first electronic device 101 and the second electronic device 102 may be electronic devices of different types. For example, the first electronic device 101 is a tablet, and the second electronic device 102 is a mobile phone (as shown in FIG. 1).

Figure 2:
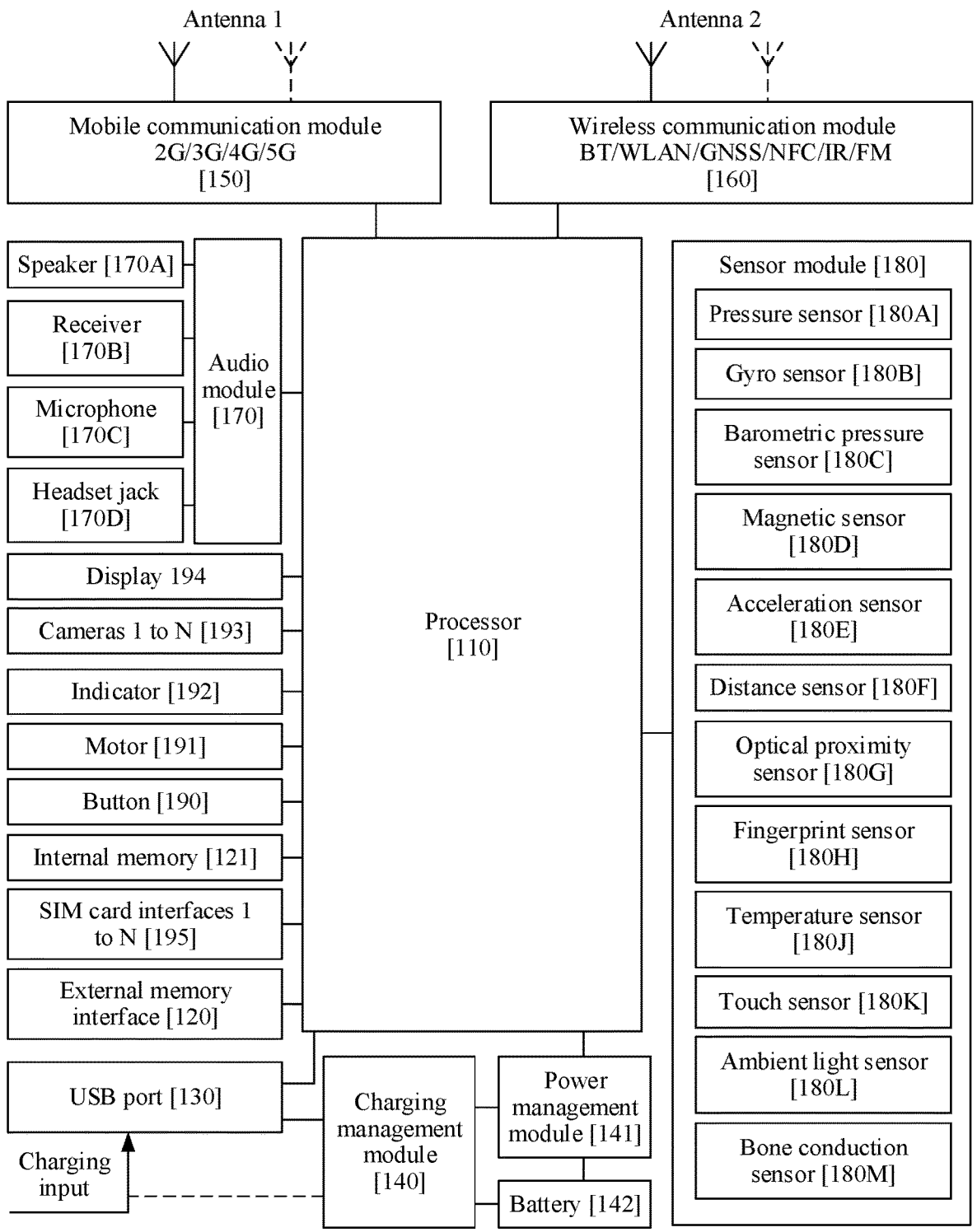
FIG. 2 is a schematic diagram of a structure of an electronic device according to an embodiment of this application.

FIG. 2 is a schematic diagram of a structure of an electronic device according to an embodiment of this application. A structure of the first electronic device 101 or the second electronic device 102 or structures of the first electronic device 101 and the second electronic device 102 may be shown in FIG. 2.

As shown in FIG. 2, the electronic device may include a processor 110, an external memory interface 120, an internal memory 121, a universal serial bus (universal serial bus, USB) port 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (subscriber identity module, SIM) card interface 195, and the like.

The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment constitutes no specific limitation on the electronic device. In some other embodiments, the electronic device may include more or fewer components than those shown in the figure, or some components may be combined, or some components may be split, or there may be a different component layout. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent components, or may be integrated into one or more processors.

The controller may be a nerve center and a command center of the electronic device. The controller may generate an operation control signal based on instruction operation code and a time sequence signal, to complete control of instruction fetching and instruction execution.

A memory may be further disposed in the processor 110, and is configured to store instructions and data. In some embodiments, the memory in the processor 110 is a cache memory. The memory may store instructions or data just used or cyclically used by the processor 110. If the processor 110 needs to use the instructions or the data again, the processor 110 may directly invoke the instructions or the data from the memory. This avoids repeated access and reduces a waiting time of the processor 110, thereby improving system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) port, and/or the like.

The charging management module 140 is configured to receive a charging input from a charger. The charger may be a wireless or wired charger. In some embodiments of wired charging, the charging management module 140 may receive a charging input from the wired charger through the USB port 130. In some embodiments of wireless charging, the charging management module 140 may receive a wireless charging input through a wireless charging coil of the electronic device. When charging the battery 142, the charging management module 140 may further supply power to the electronic device by using the power management module 141.

The power management module 141 is configured to connect the battery 142 and the charging management module 140 to the processor 110. The power management module 141 receives an input of the battery 142 and/or the charging management module 140, and supplies power to the processor 110, the internal memory 121, an external memory, the display 194, the camera 193, the wireless communication module 160, and the like. The power management module 141 may further be configured to monitor parameters such as a battery capacity, a battery cycle count, and a battery health status (electric leakage or impedance). In some other embodiments, the power management module 141 may be alternatively disposed in the processor 110. In some other embodiments, the power management module 141 and the charging management module 140 may be alternatively disposed in a same component.

A wireless communication function of the electronic device may be implemented through the antenna 1, the antenna 2, the mobile communication module 150, the wireless communication module 160, the modem processor, the baseband processor, and the like.

The antenna 1 and the antenna 2 are configured to transmit and receive electromagnetic wave signals. Each antenna in the electronic device may be configured to cover one or more communication frequency bands. Different antennas may be multiplexed to improve antenna utilization. For example, the antenna 1 may be multiplexed as a diversity antenna of a wireless local area network. In some other embodiments, the antenna may be used in combination with a tuning switch.

The mobile communication module 150 may provide a solution that is applied to the electronic device and that includes wireless communication such as 2G, 3G, 4G, and 5G. The mobile communication module 150 may include at least one filter, a switch, a power amplifier, a low noise amplifier (LNA), and the like. The mobile communication module 150 may receive an electromagnetic wave through the antenna 1, perform processing such as filtering and amplification on the received electromagnetic wave, and transmit a processed electromagnetic wave to the modem processor for demodulation. The mobile communication module 150 may further amplify a signal modulated by the modem processor, and convert an amplified signal into an electromagnetic wave for radiation through the antenna 1. In some embodiments, at least some function modules of the mobile communication module 150 may be disposed in the processor 110. In some embodiments, at least some function modules of the mobile communication module 150 and at least some modules of the processor 110 may be disposed in a same component. For example, in some embodiments, with reference to FIG. 1, the first electronic device 101 may access the first server 103 by using the mobile communication module 150 included in the first electronic device 101, to request the second server 104 to deploy an MDM service for the first electronic device 101.

The modem processor may include a modulator and a demodulator. The modulator is configured to modulate a to-be-sent low-frequency baseband signal into a medium or high-frequency signal. The demodulator is configured to demodulate a received electromagnetic wave signal into a low-frequency baseband signal. Then, the demodulator transfers the low-frequency baseband signal obtained through demodulation to the baseband processor for processing. After being processed by the baseband processor, the low-frequency baseband signal is transmitted to the application processor. The application processor outputs a sound signal through an audio device (which is not limited to the speaker 170A, the receiver 170B, or the like), or displays an image or a video through the display 194. In some embodiments, the modem processor may be an independent component. In some other embodiments, the modem processor may be independent of the processor 110, and disposed in a same component as the mobile communication module 150 or another function module.

The wireless communication module 160 may provide a solution that is applied to the electronic device and that includes wireless communication such as a wireless local area network (WLAN) (for example, a wireless fidelity (Wi-Fi) network), Bluetooth (BT), a global navigation satellite system (GNSS), frequency modulation (FM), a near field communication (NFC) technology, and an infrared (IR) technology. The wireless communication module 160 may be one or more components integrating at least one communication processor module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert a processed signal into an electromagnetic wave for radiation through the antenna 2. For example, in some embodiments, with reference to FIG. 1, the first electronic device 101 may establish a wireless P2P connection to the second electronic device 102 by using the wireless communication module 160 included in the first electronic device 101, or access a same local area network with the second electronic device 102. For another example, in some embodiments of this application, with reference to FIG. 1, the second electronic device 102 may establish a wireless P2P connection to the first electronic device 101 by using the wireless communication module 160 included in the second electronic device 102, or access a same local area network with the first electronic device 101.

In some embodiments, in the electronic device, the antenna 1 and the mobile communication module 150 are coupled, and the antenna 2 and the wireless communication module 160 are coupled, so that the electronic device can communicate with a network and another device by using a wireless communication technology. The wireless communication technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The electronic device implements a display function by using the GPU, the display 194, the application processor, and the like. The GPU is a microprocessor for image processing, and is connected to the display 194 and the application processor. The GPU is configured to perform mathematical and geometric calculation, and render an image. The processor 110 may include one or more GPUs that execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light-emitting diode (AMOLED), a flexible light-emitting diode (FLED), a mini-LED, a micro-LED, a micro-OLED, quantum dot light-emitting diodes (QLEDs), or the like. In some embodiments, the electronic device may include one or N displays 194, where N is a positive integer greater than 1.

The electronic device may implement a photographing function by using the ISP, the camera 193, the video codec, the GPU, the display 194, the application processor, and the like.

The ISP is configured to process data fed back by the camera 193. For example, during shooting, a shutter is pressed, light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a shooting scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to an ISP for converting the electrical signal into a digital image signal. The ISP outputs the digital image signal to the DSP for processing. The DSP converts the digital image signal into an image signal in a standard format, for example, RGB or YUV. In some embodiments, the electronic device may include one or N cameras 193, where N is a positive integer greater than 1.

The digital signal processor is configured to process a digital signal, and may further process another digital signal in addition to the digital image signal. For example, when the electronic device selects a frequency, the digital signal processor is configured to perform Fourier transform on frequency energy.

The video codec is configured to compress or decompress a digital video. The electronic device may support one or more video codecs. In this way, the electronic device may play or record videos in a plurality of coding formats, for example, moving picture experts group (MPEG)-1, MPEG-2, MPEG-3, and MPEG-4.

The NPU is a neural-network (NN) computing processor, quickly processes input information by referring to a structure of a biological neural network, for example, by referring to a transfer mode between human brain neurons, and may further continuously perform self-learning. The NPU can implement applications such as intelligent cognition of the electronic device, for example, image recognition, facial recognition, voice recognition, and text understanding.

The external memory interface 120 may be configured to connect to an external storage card, for example, a micro SD card, to extend a storage capability of the electronic device. The external storage card communicates with the processor 110 through the external memory interface 120, to implement a data storage function. For example, files such as music and a video are stored in the external storage card.

The internal memory 121 may be configured to store computer-executable program code. The executable program code includes instructions. The processor 110 runs the instructions stored in the internal memory 121, to implement various functional applications of the electronic device and data processing. The internal memory 121 may include a program storage area and a data storage area. The program storage area may store an operating system, an application required by at least one function (for example, a sound playing function or an image playing function), and the like. The data storage area may store data (for example, audio data or a phone book) created when the electronic device is used, and the like. In addition, the internal memory 121 may include a high-speed random access memory, and may further include a non-volatile memory, for example, at least one magnetic disk storage component, a flash memory, or a universal flash storage (UFS).

The electronic device may implement an audio function, for example, music playing or recording, by using the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may further be configured to encode and decode an audio signal. In some embodiments, the audio module 170 may be disposed in the processor 110, or some function modules of the audio module 170 are disposed in the processor 110.

The speaker 170A, also referred to as a "loudspeaker", is configured to convert an audio electrical signal into a sound signal. The electronic device may be used to listen to music or answer a hands-free call by using the speaker 170A.

The receiver 170B, also referred to as an "earpiece", is configured to convert an audio electrical signal into a sound signal. When a call is answered or voice information is received by using the electronic device, the receiver 170B may be put close to a human ear to listen to a voice.

The microphone 170C, also referred to as a "mike" or a "mic", is configured to convert a sound signal into an electrical signal. When making a call, sending voice information, or needing to trigger, by using a voice assistant, the electronic device to perform some functions, the user may make a sound near the microphone 170C through the mouth of the user, to input a sound signal to the microphone 170C. At least one microphone 170C may be disposed in the electronic device. In some other embodiments, two microphones 170C may be disposed in the electronic device, to implement a noise reduction function, in addition to collecting a sound signal. In some other embodiments, three, four, or more microphones 170C may be alternatively disposed in the electronic device, to collect a sound signal, implement noise reduction, and identify a sound source, so as to implement a directional recording function and the like.

The headset jack 170D is configured to connect to a wired headset. The headset jack 170D may be the USB port 130, or may be a 3.5 mm open mobile terminal platform (OMTP) standard interface, or a cellular telecommunications industry association of the USA (CTIA) standard interface.

The pressure sensor 180A is configured to sense a pressure signal, and can convert the pressure signal into an electrical signal. In some embodiments, the pressure sensor 180A may be disposed on the display 194. There are many types of pressure sensors 180A, for example, a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device determines strength of pressure based on a change of the capacitance. When a touch operation is performed on the display 194, the electronic device detects strength of the touch operation by using the pressure sensor 180A. The electronic device may further calculate a touch position based on a detection signal of the pressure sensor 180A. In some embodiments, touch operations that are performed in a same touch position but have different touch operation intensity may correspond to different operation instructions. For example, when a touch operation whose touch operation intensity is less than a first pressure threshold is performed on an icon of a messaging application, an instruction for viewing an SMS message is executed. When a touch operation whose touch operation intensity is greater than or equal to the first pressure threshold is performed on the icon of the messaging application, an instruction for creating an SMS message is executed.

The gyro sensor 180B may be configured to determine a motion posture of the electronic device. In some embodiments, angular velocities of the electronic device around three axes (namely, axes x, y, and z) may be determined by using the gyro sensor 180B. The gyro sensor 180B may be configured to perform image stabilization during photographing. For example, when the shutter is pressed, the gyro sensor 180B detects a jitter angle of the electronic device, calculates, based on the angle, a distance for which a lens module needs to compensate, and enables the lens to offset jitter of the electronic device through reverse motion, to implement image stabilization. The gyro sensor 180B may be further used in a navigation scenario and a motion-sensing game scenario.

The barometric pressure sensor 180C is configured to measure barometric pressure. In some embodiments, the electronic device calculates an altitude by using the barometric pressure measured by the barometric pressure sensor 180C, to assist in positioning and navigation.

The magnetic sensor 180D includes a Hall effect sensor. The electronic device may detect opening and closing of a flip cover by using the magnetic sensor 180D. In some embodiments, when the electronic device is a flip phone, the electronic device may detect opening and closing of a flip cover based on the magnetic sensor 180D. Further, a feature, for example, automatic unlocking upon opening of the flip cover, is set based on a detected opening or closing state of the flip cover.

The acceleration sensor 180E may detect magnitude of accelerations of the electronic device in various directions (usually on three axes), and may detect magnitude and a direction of gravity when the electronic device is stationary. The acceleration sensor 180E may be further configured to identify a posture of the electronic device, and is used in an application, for example, switching between a landscape mode and a portrait mode or a pedometer.

The distance sensor 180F is configured to measure a distance. The electronic device may measure a distance through infrared or laser. In some embodiments, in a photographing scenario, the electronic device may measure a distance by using the distance sensor 180F, to implement quick focusing.

The optical proximity sensor 180G may include a light-emitting diode (LED) and an optical detector, for example, a photodiode. The light-emitting diode may be an infrared light-emitting diode. The electronic device emits infrared light by using the light-emitting diode. The electronic device detects infrared reflected light from a nearby object by using the photodiode. When sufficient reflected light is detected, it may be determined that there is an object near the electronic device. When detecting insufficient reflected light, the electronic device may determine that there is no object near the electronic device. The electronic device may detect, by using the optical proximity sensor 180G, that a user holds the electronic device close to an ear for a call, to automatically turn off a screen for power saving. The optical proximity sensor 180G may also be used in smart cover mode or pocket mode to automatically perform screen unlocking or locking.

The ambient light sensor 180L is configured to sense ambient light brightness. The electronic device may adaptively adjust brightness of the display 194 based on the sensed ambient light brightness. The ambient light sensor 180L may also be configured to automatically adjust white balance during shooting. The ambient light sensor 180L may further cooperate with the optical proximity sensor 180G to detect whether the electronic device is in a pocket, to avoid an unintentional touch.

The fingerprint sensor 180H is configured to collect a fingerprint. The electronic device may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device executes a temperature processing policy by using the temperature detected by the temperature sensor 180J. For example, when the temperature reported by the temperature sensor 180J exceeds a threshold, the electronic device reduces performance of a processor near the temperature sensor 180J, to reduce power consumption and implement heat protection. In some other embodiments, when the temperature is lower than another threshold, the electronic device heats up the battery 142, to avoid an abnormal shutdown of the electronic device due to a low temperature. In some other embodiments, when the temperature is lower than still another threshold, the electronic device boosts an output voltage of the battery 142, to avoid an abnormal shutdown caused by a low temperature.

The touch sensor 180K is also referred to as a "touch panel". The touch sensor 180K may be disposed on the display 194, and the touch sensor 180K and the display 194 constitute a touchscreen, which is also referred to as a "touch screen". The touch sensor 180K is configured to detect a touch operation performed on or near the touch sensor 180K. The touch sensor may transfer the detected touch operation to the application processor to determine a type of a touch event. A visual output related to the touch operation may be provided through the display 194. In some other embodiments, the touch sensor 180K may be alternatively disposed on a surface of the electronic device, and is located at a location different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may be also in contact with a human pulse, and receive a blood pressure beating signal. In some embodiments, the bone conduction sensor 180M may be alternatively disposed in a headset, to constitute a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or a touch button. The electronic device may receive a button input, and generate a button signal input related to user setting and function control of the electronic device.

The motor 191 may generate a vibration prompt. The motor 191 may be used for an incoming call vibration prompt or a touch vibration feedback. For example, touch operations performed on different applications (for example, shooting and audio playing) may correspond to different vibration feedback effects. For touch operations performed on different areas of the display 194, the motor 191 may also correspond to different vibration feedback effects. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device. The electronic device may support one or N SIM card interfaces, where N is a positive integer greater than 1. The SIM card interface 195 can support a nano-SIM card, a micro-SIM card, a SIM card, and the like. A plurality of cards may be inserted into a same SIM card interface 195 at the same time. The plurality of cards may be of a same type or different types. The SIM card interface 195 may also be compatible with different types of SIM cards. The SIM card interface 195 may also be compatible with an external storage card. The electronic device interacts with a network by using the SIM card, to implement functions such as a call and data communication. In some embodiments, the electronic device uses an eSIM, namely, an embedded SIM card. The eSIM card may be embedded into the electronic device, and cannot be separated from the electronic device.

All methods in the following embodiments may be implemented on the electronic device having the foregoing hardware structure.

Figure 3A:
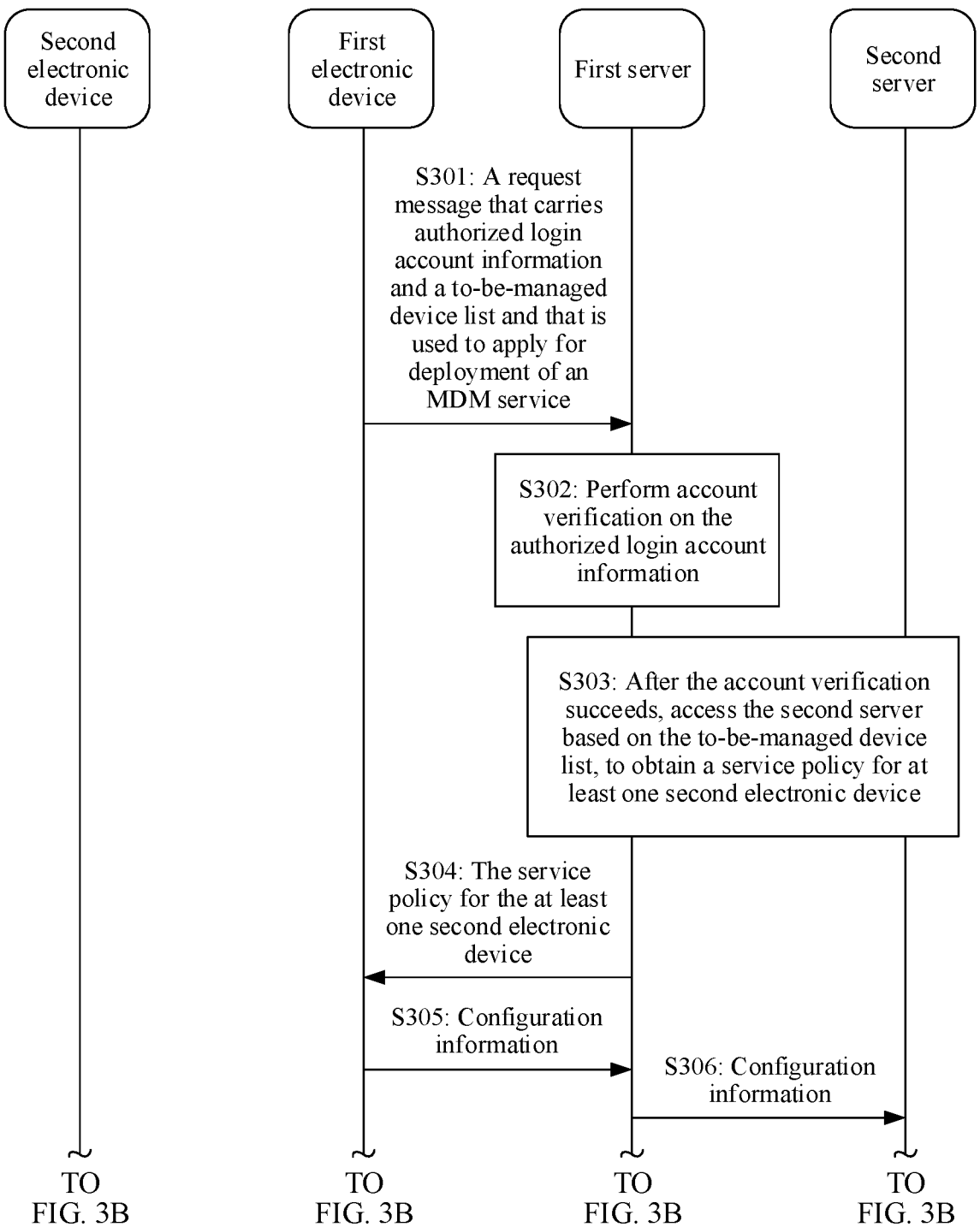
FIG. 3A and FIG. 3B are a schematic flowchart of a mobile device management method according to an embodiment of this application.
Figure 3B:
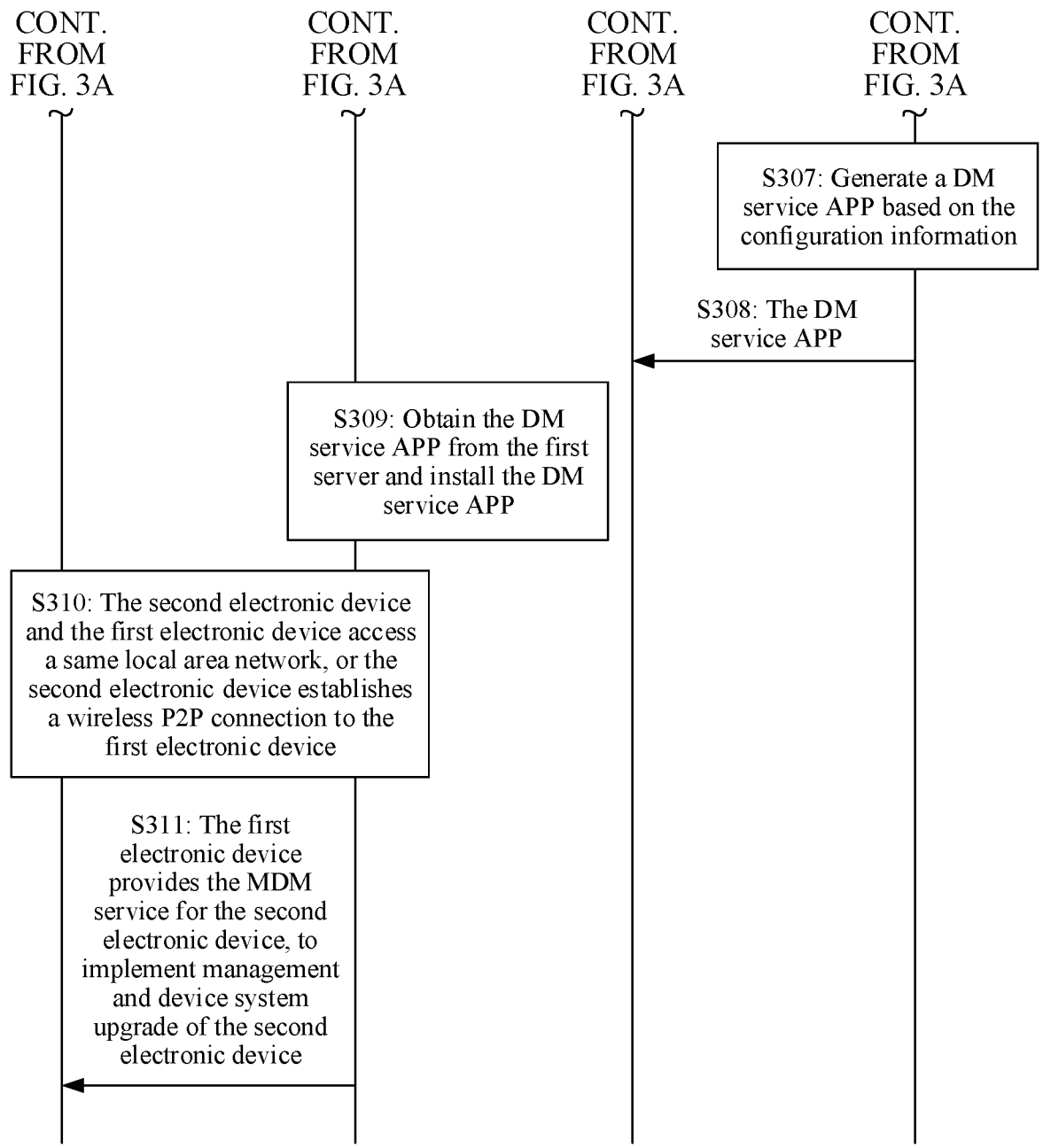

FIG. 3A and FIG. 3B are a schematic flowchart of a mobile device management method according to an embodiment of this application. With reference to the mobile device management system shown in FIG. 1, as shown in FIG. 3A and FIG. 3B, the method may include the following steps.

The mobile device management method provided in this embodiment of this application may be divided into two phases, for example, referred to as a first phase and a second phase. In the first phase, deployment of an MDM service is mainly implemented, and the following S301 to S309 may be included. In the second phase, device system upgrade and management of a to-be-managed device are mainly implemented, and the following S310 and S311 may be included.

S301: A first electronic device sends a request message to a first server, where the request message is used to apply for deployment of the MDM service.

The request message may carry authorized login account information and a to-be-managed device list. The to-be-managed device list may include an identifier of at least one second electronic device. The second electronic device may be a to-be-managed electronic device. The identifier may be an international mobile equipment identity (IEMI) of a to-be-managed electronic device, or may be another identifier of a to-be-managed electronic device, for example, a media access control (MAC) address.

In some embodiments, the authorized login account information and the to-be-managed device list may be configured by a user (for example, an enterprise IT administrator) on the first electronic device. The first electronic device is a device configured to manage another mobile device, for example, may be referred to as a master device. After successfully applying for deployment of the MDM service, the first electronic device may be configured to provide the MDM service, for example, including a system upgrade service and a management service, for a device corresponding to an identifier included in the to-be-managed device list.

For example, to facilitate work of enterprise employees, an enterprise may purchase a plurality of mobile devices in batches for the enterprise employees to use. To ensure information security when the enterprise employees use these mobile devices to access enterprise intranet resources, unified security management needs to be performed on these mobile devices. When the enterprise purchases these mobile devices, a device vendor (for example, a device producer or a device seller) may grant authorized login account information and a device information list bound to the authorized login account information to an IT administrator of the enterprise. The device information list bound to the authorized login account information includes identifiers of the mobile devices purchased by the enterprise in batches. A device that successfully applies for the MDM service by using the authorized login account information can perform management and device system upgrade only on a device corresponding to an identifier included in the device information list bound to the authorized login account information.

After obtaining the authorized login account information and the device information list bound to the authorized login account information, the IT administrator of the enterprise may obtain the to-be-managed device list based on the device information list. The to-be-managed device list may include all the identifiers in the device information list, or may include some identifiers in the device information list. In other words, the IT administrator can choose to manage some or all of the mobile devices that are purchased in batches. The IT administrator may configure the authorized login account information and the to-be-managed device list on the first electronic device. The first electronic device may be one (for example, any one or a specified one) of the mobile devices purchased by the enterprise in batches, or the first electronic device may not be one of the mobile devices purchased in batches. This is not specifically limited in this embodiment. Then, the first electronic device may send, to the first server, a request message that carries the authorized login account information and the to-be-managed device list, to apply for deployment of the MDM service.

For example, the first electronic device is a tablet, and the second electronic device is a mobile phone. An enterprise purchases 1,000 Huawei phones for enterprise employees to use. In addition, during the purchase, a device vendor grants authorized login account information and a device information list (where the device information list includes IEMIs of the 1,000 Huawei phones) bound to the authorized login account information to an IT administrator of the enterprise. The IT administrator configures the authorized login account information and a to-be-managed device list on the tablet. For example, the to-be-managed device list includes the IEMIs of the 1,000 Huawei phones. Then, the tablet may send, to the first server, a request message that carries the IEMIs of the 1,000 Huawei phones and the authorized login account information, to request to deploy an MDM service on the tablet, so as to perform management and device system upgrade on the 1,000 Huawei phones.

S302: The first server performs account verification on the authorized login account information from the first electronic device.

After receiving the request message from the first electronic device, the first server may perform account verification on the authorized login account information carried in the request message. In some other embodiments, the first server may alternatively delegate another server, for example, a server (for example, which may be referred to as an account verification server) that is configured to perform account verification and that is disposed independent of the first server, to perform account verification on the authorized login account information in the request message from the first electronic device. After completing the account verification, the server may return a verification result to the first server.

For example, a server that performs account verification, for example, the first server or the account verification server, may pre-store valid authorized login account information that can be used to apply for deployment of the MDM service, and can implement the account verification performed on the authorized login account information from the first electronic device based on the stored valid authorized login account information, to verify validity of the first electronic device that applies for deployment of the MDM service. If the authorized login account information from the first electronic device is the same as the valid authorized login account information stored in the server, the account verification succeeds, and it may be determined that the first electronic device that applies for deployment of the MDM service is legal. If the authorized login account information from the first electronic device is the different from the valid authorized login account information stored in the server, the account verification fails, and it may be determined that the first electronic device that applies for deployment of the MDM service is illegal.

S303: After the account verification succeeds, the first server accesses a second server based on the to-be-managed device list, to obtain a service policy for at least one second electronic device.

The service policy may include one or more of the following policies: a management policy, a configuration policy, and an upgrade policy. The management policy may include at least one of the following: a device management policy, a network management policy, a security management policy, an email management policy, a content management policy, an application management policy, and the like. The configuration policy may include a desktop wallpaper setting policy, a startup animation setting policy, a ringtone setting policy, and the like.

After the account verification performed on the authorized login account information from the first electronic device succeeds, the first server may access the second server based on the to-be-managed device list from the first electronic device, to obtain the service policy for the at least one second electronic device in the to-be-managed device list. For example, the first server may obtain a device model of each second electronic device based on the identifier (for example, an IEMI) of the at least one second electronic device included in the to-be-managed device list, to obtain a model set of a to-be-managed device. The model set of the to-be-managed device includes at least one device model. The first server may access the second server based on the model set of the to-be-managed device, to obtain a service policy based on each device model, that is, obtain the service policy for the at least one second electronic device in the to-be-managed device list.

For example, with reference to the example in S301, after account verification performed by the first server on the authorized login account information from the tablet succeeds, the first server may obtain a model of each of the 1,000 Huawei phones based on the IEMIs of the 1,000 Huawei phones included in the to-be-managed device list, to obtain a model set of to-be-managed devices. For example, the 1,000 Huawei phones include four device models: HUAWEI Mate 20 Pro, HUAWEI Mate 20, HUAWEI Mate 10, and HUAWEI nova 4. In this case, the model set of the to-be-managed devices includes four device models: HUAWEI Mate 20 Pro, HUAWEI Mate 20, HUAWEI Mate 10, and HUAWEI nova 4. The first server may send the model set of the to-be-managed devices to the second server. After receiving the model set of the to-be-managed devices, the second server may send, to the first server, a service policy corresponding to each device model. For example, the service policies sent by the second server include a service policy corresponding to HUAWEI Mate 20 Pro, a service policy corresponding to HUAWEI Mate 20, a service policy corresponding to HUAWEI Mate 10, and a service policy corresponding to HUAWEI nova 4. After receiving the service policy sent by the second server, the first server may obtain a service policy corresponding to each device model, that is, obtain service policies for the 1,000 Huawei phones in the to-be-managed device list.

It should be noted that, when accessing the second server, the first server may further carry the authorized login account information from the first electronic device, so that the second server learns of access validity of the first server.

S304: The first server sends the service policy for the at least one second electronic device to the first electronic device.

After obtaining the service policy for the at least one second electronic device, the first server may send the obtained service policy to the first electronic device, so that the first electronic device displays a corresponding interface (for example, referred to as a setting interface) according to the received service policy for an IT administrator to view and perform related setting, to implement device management and function configuration.

For example, still with reference to the example in S303, after obtaining the service policy for the 1,000 Huawei phones in the to-be-managed device list, the first server may send the obtained service policy to the tablet. After receiving the related service policy, the tablet may display a corresponding interface according to the service policy. The IT administrator can perform corresponding management and function configuration on the 1,000 devices on an interface displayed on the tablet.

For example, in a service policy for a device whose device model is HUAWEI Mate 20, an upgrade policy is that a version A may be upgraded to a version B, a management policy includes a device management policy, a network management policy, a security management policy, an email management policy, a content management policy, and an application management policy, and a configuration policy includes setting a desktop wallpaper, a startup animation, and a ringtone. The security management policy includes management of some functions after the device whose device model is HUAWEI Mate 20 is upgraded from the version A to the version B, for example, management of whether to disable factory settings restoration, whether to disable developer options, whether to disable location services, reading locations of managed devices, whether to disable system upgrade, whether to disable sleep menus, and whether to disable fingerprint unlocking.

Figure 4:
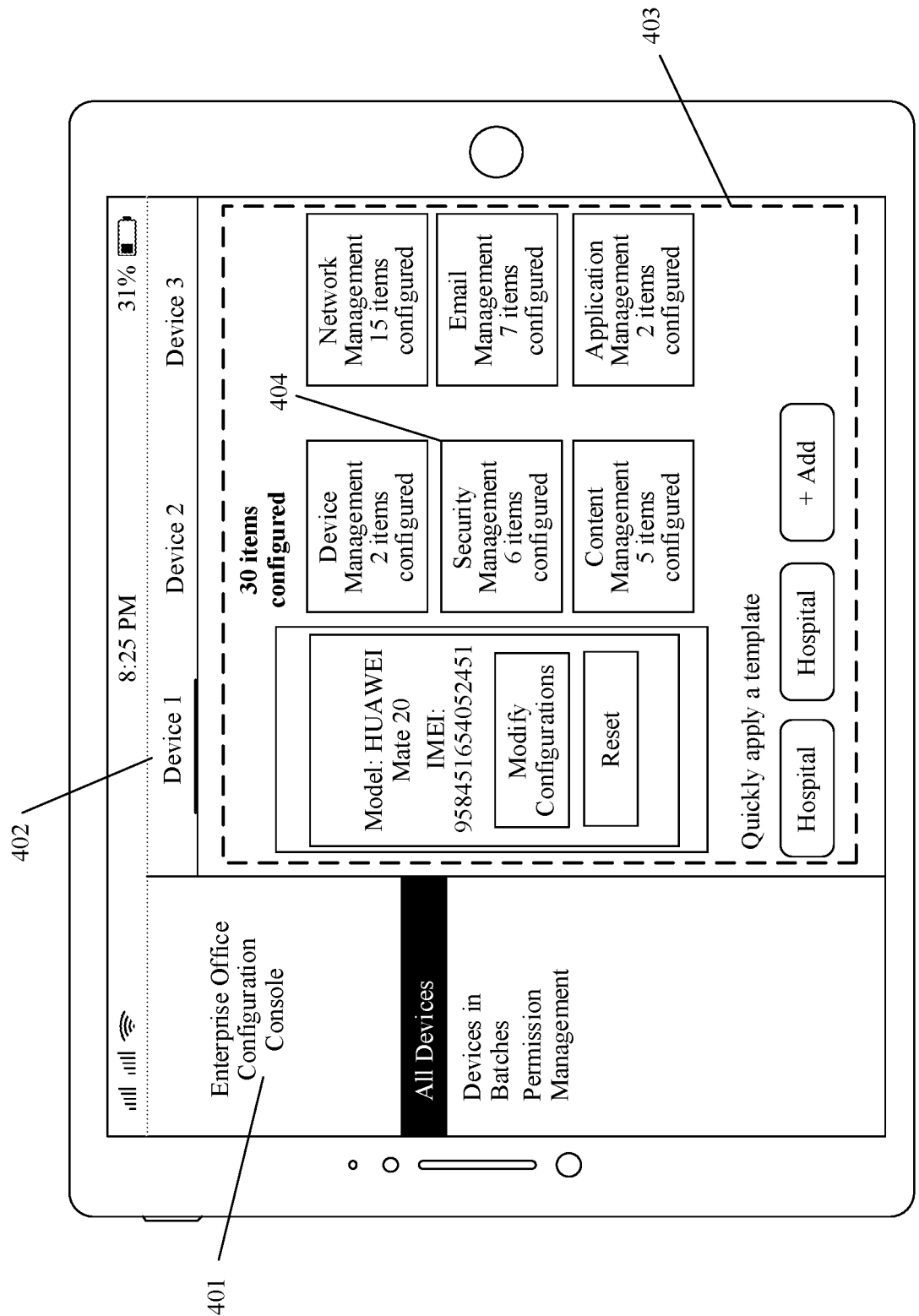
FIG. 4 is a schematic diagram of a mobile device management interface according to an embodiment of this application.
Figure 5:
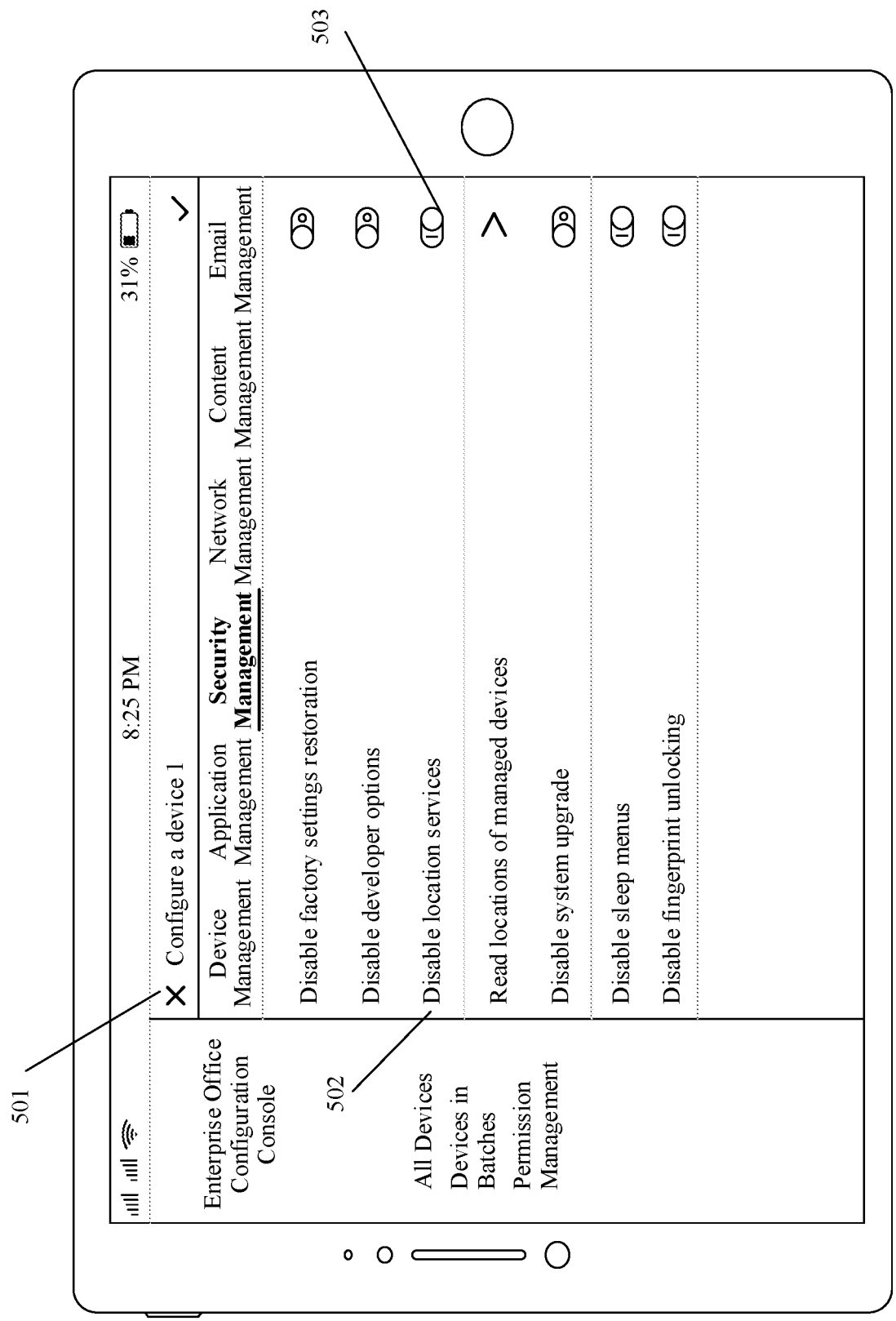
FIG. 5 is a schematic diagram of another mobile device management interface according to an embodiment of this application.

As shown in FIG. 4, after the IT administrator enters an interface 401 of an enterprise office configuration console, if a device 1 in the 1,000 Huawei phones is selected, for example, 402 shown in FIG. 4, the tablet may display related settings 403 for the device 1 according to a service policy corresponding to a device model (HUAWEI Mate 20) of the device 1, for example, including a device management setting item, a network management setting item, a security management setting item 404, an email management setting item, a content management setting item, and an application management setting item. The IT administrator selects a corresponding setting item in the related settings 403, to implement corresponding management of the device 1. For example, the IT administrator wants to manage whether a location function can be used after the device 1 is upgraded from the version A to the version B. The IT administrator may perform an operation on the security management setting item 404 in the related settings 403. In response to the operation, as shown in FIG. 5, the tablet may display a security management setting interface 501 of the device 1. The security management setting interface 501 includes functions that can be managed after the device 1 is upgraded from the version A to the version B, and the functions include: whether to disable factory settings restoration, whether to disable developer options, whether to disable location services, reading locations of managed devices, whether to disable system upgrade, whether to disable sleep menus, and whether to disable fingerprint unlocking. Switch buttons for disabling these functions may be in a disabled state by default. To be specific, after the device 1 is upgraded from the version A to the version B, a corresponding function can be used by default, for example, the location service can be used. If the IT administrator wants to disable this function, for example, the location service, the IT administrator may perform an operation on a button 503 corresponding to disabling a location service. In response to the operation, management of disabling the location service function after the device 1 is upgraded from the version A to the version B can be implemented.

The tablet may further display another related setting for the device 1 according to the service policy corresponding to the device model (HUAWEI Mate 20) of the device 1. For example, the tablet displays corresponding configuration interfaces according to the configuration policy, for example, a desktop wallpaper setting interface, a startup animation setting interface, and a ringtone setting interface. In this way, the IT administrator can upload corresponding resources such as a desktop wallpaper, a startup animation, and a ringtone on the corresponding configuration interfaces, to set a desktop wallpaper, a startup animation, a ringtone, and the like for the device 1. For devices of different device models, resources, such as a desktop wallpaper, a startup animation, and a ringtone, that are set by the IT administrator may be the same or different.

Figure 6:
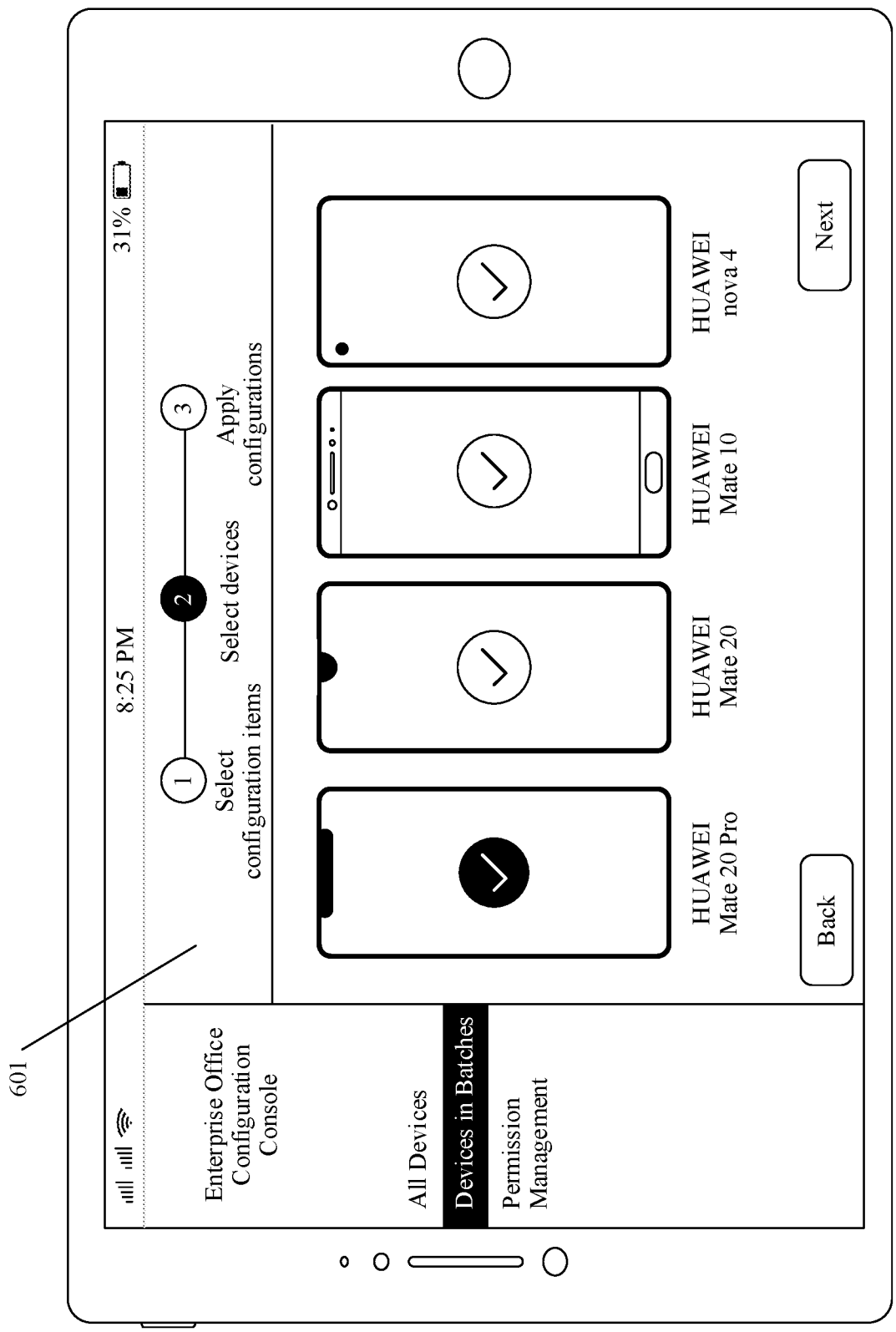
FIG. 6 is a schematic diagram of a still another mobile device management interface according to an embodiment of this application.

It should be noted that the foregoing example is described by using an example in which the IT administrator separately performs corresponding management and function configuration on the devices purchased in batches. In some other embodiments, the IT administrator may alternatively perform corresponding management and function configuration at the same time on a plurality of devices in the devices purchased in batches. For example, after performing related setting (for example, for a setting interface, refer to FIG. 4 and FIG. 5), the IT administrator may select a device model to which the setting is applicable. As shown in FIG. 6, the IT administrator may select, on a shown interface 601, the device model to which the setting is applicable, for example, HUAWEI Mate 20 Pro. In this way, corresponding management and function configuration can be performed on devices of these device models at the same time. For another example, after performing related setting (for example, for a setting interface, refer to FIG. 4 and FIG. 5), the IT administrator may select devices to which the setting is applicable. In this way, corresponding management and function configuration can be performed on the selected devices at the same time. In addition, the first electronic device can perform OTA management on all the managed second electronic devices, and may set a corresponding system upgrade policy (or referred to as an upgrade policy) for all the devices, or for a device of a specific model, or for one or more specific second electronic devices based on a requirement of an enterprise, a specific service, or a specific post. Specifically, for example, a system upgrade policy for a device of a device model received by the first electronic device includes: upgrading from a version A to a version B, upgrading from the version A to a version C (where the version C is a version obtained after the version B is updated), and upgrading from the version A to a version D (where the version D is a version obtained after the version C is updated). A related interface may be displayed for the IT administrators to perform management on a system upgrade version, for example, whether to allow the device of the device model to perform system upgrade, and for another example, a version to which the device of the device model is allowed to be upgraded. For example, on the interface, the IT administrator may select that the device of the device model may be upgraded from the version A to the version B. For another example, on the interface, the IT administrator may select that system version upgrade is not allowed on the device of the device model. The first electronic device may generate corresponding configuration information based on a setting of the IT administrator, and send the configuration information to the first server. The first server may return a corresponding DM service APP to the first electronic device based on the configuration information. In the DM service APP, only system upgrade information corresponding to a corresponding second electronic device is provided for the corresponding second electronic device. For example, the IT administrator sets that devices of some models do not need to be upgraded, and only a security patch needs to be installed. In this case, after the first electronic device sends the corresponding configuration information to the first server, in the DM service APP returned by the first server, only security patches corresponding to the devices of these models are sent. In this way, the first electronic device can flexibly manage system upgrade of all the second electronic devices managed by the first electronic device, to avoid a situation in which the second electronic device is either upgraded to a latest version or is not upgraded, and reduce problems that the second electronic device cannot be returned to an appropriate version after the second electronic device is accidentally upgraded to the latest version but the latest version is inappropriate.

After the IT administrator completes corresponding management and function configuration of the at least one second electronic device in the to-be-managed device list, for example, the 1,000 devices in the foregoing example, the first electronic device may send, to the first server, related configuration information obtained after the IT administrator performs corresponding management and function configuration.

S305: The first server receives configuration information from the first electronic device.

S306: The first server sends the configuration information to the second server.

The configuration information includes a related configuration parameter generated after management and function configuration for the at least one second electronic device. For example, with reference to the example in S304, the configuration information includes a setting parameter that is used to indicate that the device 1 whose device model is HUAWEI Mate 20 may be upgraded from the version A to the version B, and after the device 1 is upgraded from the version A to the version B, the location service function is disabled. The configuration information may further include the desktop wallpaper, the startup animation, and the ringtone that are set for the device 1.

After receiving the configuration information from the first electronic device, the first server may send the configuration information to the second server. In some other embodiments, after the first server receives the configuration information, a background worker may review resources, such as a desktop wallpaper, a startup animation, and a ringtone, that are included in the configuration information, and review whether these resources comply with policies and regulations. After the review succeeds, the first server sends the configuration information to the second server.

S307: The second server generates a DM service APP based on the configuration information.

S308: The second server sends the DM service APP to the first server.

After receiving the configuration information from the first server, the second server may generate, based on the configuration information, a DM service APP corresponding to the authorized login account information of the first electronic device, and send the generated DM service APP to the first server. For example, with reference to the example in S306, the DM service APP includes a data resource, for example, an upgrade package, and for another example, the desktop wallpaper, the startup animation, and the ringtone that are set for the device 1. The DM service APP further includes a configuration for the at least one second electronic device, for example, disabling the location service function for the device 1.

In some embodiments, after receiving the DM service APP corresponding to the authorized login account information of the first electronic device, the first server may sign the DM service APP by using a preconfigured private key of the first server. In this way, the DM service APP can be prevented from being tampered with. For sensitive data in the DM service APP, for example, the upgrade package, the first server may further encrypt the sensitive data by using an encryption key derived based on a public key of the first electronic device. In this way, it can be ensured that the sensitive data can be successfully decrypted and used only on the first electronic device.

S309: The first electronic device obtains the DM service APP from the first server and installs the DM service APP.

After the first server obtains the DM service APP corresponding to the authorized login account information of the first electronic device, the first server may deliver the DM service APP to the first electronic device, so that the first electronic device obtains the corresponding DM service APP and installs the DM service APP.

In some embodiments, if the first server performs signature and encryption processing on the DM service APP, after obtaining the DM service APP, the first electronic device may verify the signature of the DM service APP by using a preset public key of the first server, and may further decrypt the sensitive data in the DM service APP by using a private key of the first electronic device, to obtain the decrypted DM service APP, and then the first electronic device installs the DM service APP.

After the DM service APP is installed on the first electronic device, the MDM service is deployed on the first electronic device. Then, the first electronic device may provide the MDM service for the at least one second electronic device (where a DM client APP is preset on the second electronic device, and is configured to communicate with the first electronic device) in the to-be-managed device list, for example, including the management service and the system upgrade service, to implement management and device system upgrade of the second electronic device. For example, the following S310 and S311 are included. In this process, neither the first electronic device nor the second electronic device needs to be connected to the Internet.

S310: The second electronic device and the first electronic device access a same local area network, or the second electronic device establishes a wireless P2P connection to the first electronic device.

S311: The first electronic device provides the MDM service for the second electronic device, to implement management and device system upgrade of the second electronic device.

After the second electronic device and the first electronic device access the same local area network, or the second electronic device establishes the wireless P2P connection (for example, a Wi-Fi direct connection, a Bluetooth connection, or an NFC connection) to the first electronic device, the first electronic device and the second electronic device may perform mutual authentication, for example, the authentication may be completed based on a hardware attestation key (Attestation Key). After the mutual authentication succeeds, the first electronic device may provide the MDM service for the second electronic device according to an MDM protocol, to implement management and device system upgrade of the second electronic device.

For example, after the mutual authentication between the first electronic device and the second electronic device succeeds, the second electronic device may send a service request to the first electronic device. The service request may include the identifier of the second electronic device. After receiving the service request, the first electronic device may send, to the second electronic device based on the identifier in the service request, resources such as the upgrade package of the device, a set desktop wallpaper, startup animation, and ringtone, and the configuration for the device. After receiving corresponding data, the second electronic device may perform system upgrade, and perform related setting based on the configuration. For example, with reference to the example in S308, after sending the IEMI of the device 1 to the tablet, the device 1 may receive, from the tablet, resources such as a corresponding upgrade package, the set desktop wallpaper, startup animation, and ringtone, and a configuration for the device 1. The device 1 may upgrade a system of the device 1 from the version A to the version B by using the received data, and after the system is upgraded to the version B, the location service function of the device 1 is disabled. In addition, the device 1 further performs corresponding setting based on the received desktop wallpaper, startup animation, ringtone, and the like. In this way, the tablet implements management and device system upgrade of the device 1. In some other embodiments, after the mutual authentication between the first electronic device and the second electronic device succeeds, the first electronic device may alternatively actively push a service to the second electronic device. For example, after the mutual authentication between the first electronic device and the second electronic device succeeds, the first electronic device actively sends resources such as the configuration for the device, the corresponding upgrade package, and a set desktop wallpaper, startup animation, and ringtone to the second electronic device. In some other embodiments, after the mutual authentication between the first electronic device and the second electronic device succeeds, the first electronic device may alternatively push a service to the second electronic device when determining that the second electronic device needs to update a service, for example, needs to update a device system.

The foregoing example is described by using an example of configuring to allow the second electronic device to perform version upgrade. In some other embodiments, it may alternatively be configured that a second electronic device is not allowed to perform system version upgrade. In this embodiment, if a user of the second electronic device chooses to upgrade a system version of the device, the request is not allowed. When receiving the operation, the second electronic device may further display prompt information to prompt the user that the system upgrade is forbidden on the device.

According to the mobile device management method provided in this embodiment of this application, an MDM service is deployed on an electronic device, so that an enterprise can implement management and device system upgrade of a to-be-managed electronic device in a local area network or a near field environment by using the electronic device on which the MDM service is deployed, without connecting the to-be-managed electronic device to a network. This resolves a problem that management and device system upgrade of an electronic device that is of inconvenience in being connected to a network cannot be implemented. In addition, the to-be-managed electronic devices do not need to be separately connected to the Internet to download related data, which saves traffic and reduces service costs. In addition, the MDM service is deployed on the electronic device to implement device management and device system upgrade, without purchasing a service provided by an MDM service provider, which reduces device management costs. After the MDM service is deployed on the electronic device, because the electronic device and the to-be-managed electronic device do not need to be connected to the Internet, an enterprise that cannot use a public network to perform system upgrade (OTA upgrade) can implement device system upgrade and other management by using the solution provided in this embodiment.

Some other embodiments of this application further provide an electronic device (for example, the first electronic device in the foregoing embodiments), configured to implement the method described in the foregoing method embodiments. The electronic device may include a processor and a memory. The processor is coupled to the memory. The memory is configured to store computer program code. The computer program code includes computer instructions. When the computer instructions are executed by the electronic device, the electronic device is enabled to perform a corresponding step in the foregoing embodiments.

Some other embodiments of this application further provide a server (for example, the first server or the second server in the foregoing embodiments), configured to implement the method described in the foregoing method embodiments. The server may include a processor and a memory. The processor is coupled to the memory. The memory is configured to store computer program code. The computer program code includes computer instructions. When the computer instructions are executed by the server, the server is enabled to perform a corresponding step in the foregoing embodiments.

Some other embodiments of this application further provide a computer-readable storage medium. The computer-readable storage medium may include computer software instructions. When the computer software instructions are run on an electronic device (for example, the first electronic device in the foregoing embodiments), the electronic device is enabled to perform a corresponding step in the foregoing embodiments.

Some other embodiments of this application further provide a computer-readable storage medium. The computer-readable storage medium may include computer software instructions. When the computer software instructions are run on a server (for example, the first server or the second server in the foregoing embodiments), the server is enabled to perform a corresponding step in the foregoing embodiments.

Some other embodiments of this application further provide a computer program product. When the computer program product runs on a computer, the computer is enabled to perform a corresponding step performed by the first electronic device, the first server, or the second server in the foregoing embodiments.

Some other embodiments of this application further provide an apparatus, configured to implement the method described in the foregoing method embodiments. The apparatus has a function of implementing behavior of the first electronic device in the foregoing embodiments. The function may be implemented by hardware, or may be implemented by hardware executing corresponding software. The hardware or the software includes one or more modules corresponding to the function, for example, a sending unit or module, a receiving unit or module, a wireless connection unit or module, a service providing unit or module, a display unit or module, an input unit or module, and a verification unit or module.

Some other embodiments of this application further provide an apparatus, configured to implement the method described in the foregoing method embodiments. The apparatus has a function of implementing behavior of the first server in the foregoing embodiments. The function may be implemented by hardware, or may be implemented by hardware executing corresponding software. The hardware or the software includes one or more modules corresponding to the function, for example, a sending unit or module, a receiving unit or module, a verification unit or module, an obtaining unit or module, and a signature encryption unit or module.

The foregoing descriptions about the implementations allow a person skilled in the art to clearly understand that, for convenient and brief description, division into the foregoing function modules is merely used as an example for description. During actual application, the foregoing functions can be allocated to different function modules for implementation based on a requirement. In other words, an inner structure of an apparatus is divided into different function modules to implement all or some of the functions described above.

In the several embodiments provided in this application, it should be understood that the disclosed apparatus and method may be implemented in other manners. For example, the described apparatus embodiments are merely examples. For example, division into the modules or units is merely logical function division, and may be other division in an actual implementation. For example, a plurality of units or components may be combined or may be integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in an electronic, mechanical, or another form.

The units described as separate parts may or may not be physically separate, and parts displayed as units may be one or more physical units, may be located in one place, or may be distributed at different places. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in a form of a software functional unit and sold or used as an independent product, the integrated unit may be stored in a readable storage medium. Based on such an understanding, technical solutions in embodiments of this application may be implemented in a form of a software product. The software product is stored in a storage medium and includes several instructions for instructing a device (which may be a single-chip microcomputer, a chip, or the like) or a processor to perform all or some of the steps of the methods in embodiments of this application. The foregoing storage medium includes any medium that can store program code, for example, a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement within the technical scope disclosed in this application may fall within the protection scope of this application.

What is claimed is:

1. A mobile device management method, comprising:
    sending, by a first electronic device, a request message to a first server, wherein the request message comprises an identifier of a second electronic device, wherein the request message is for applying for deployment of a mobile device management (MDM) service, and wherein the MDM service is for management and device system upgrade of the second electronic device;
    receiving, by the first electronic device, a device management (DM) service application (APP) from the first server, and installing the DM service APP, wherein after the DM service APP is installed, the first electronic device is capable of providing the MDM service;
    establishing, by the first electronic device, a wireless peer-to-peer (P2P) connection to the second electronic device, or accessing, by the first electronic device, a same local area network as the second electronic device; and
    providing, by the first electronic device, the MDM service for the second electronic device for management and device system upgrade of the second electronic device.

2. The method according to claim 1, wherein the request message further comprises authorized login account information, and wherein the identifier of the second electronic device corresponds to the authorized login account information.

3. The method according to claim 1, wherein before receiving the DM service APP from the first server and installing the DM service APP, the method further comprises:
    receiving, by the first electronic device, a service policy for the second electronic device from the first server;
    displaying, by the first electronic device, a setting interface according to the service policy for the second electronic device;
    receiving, by the first electronic device, a management and function configuration provided by a user for the second electronic device via the setting interface; and
    sending, by the first electronic device, configuration information to the first server, wherein the configuration information comprises a configuration parameter obtained after the user performs management and function configuration on the second electronic device.

4. The method according to claim 1, wherein before installing the DM service APP, the method further comprises:
    verifying, by the first electronic device, a signature of the DM service APP by using a preset public key of the first server; and
    decrypting, by the first electronic device, the DM service APP by using a private key of the first electronic device.

5. A mobile device management method, comprising:
    receiving, by a first server, a request message from a first electronic device, wherein the request message comprises an identifier of a second electronic device, wherein the request message is for applying for deployment of a mobile device management (MDM) service, and wherein the MDM service is for management and device system upgrade of the second electronic device;
    accessing, by the first server, a second server based on the identifier of the second electronic device to obtain a device management (DM) service application (APP), wherein the DM service APP is to be used by the first electronic device to provide the MDM service; and
    sending, by the first server, the DM service APP to the first electronic device.

6. The method according to claim 5, wherein the request message further comprises authorized login account information, and wherein the identifier of the second electronic device corresponds to the authorized login account information; and
    wherein the method further comprises: performing, by the first server, account verification on the authorized login account information; and
    wherein accessing, the second server based on the identifier of the second electronic device further comprises: after the account verification performed on the authorized login account information succeeds, accessing, by the first server, the second server based on the identifier of the second electronic device to obtain the DM service APP.

7. The method according to claim 5, wherein accessing the second server based on the identifier of the second electronic device further comprises:
    accessing, by the first server, the second server based on the identifier of the second electronic device to obtain a service policy for the second electronic device;
    sending, by the first server, the service policy for the second electronic device to the first electronic device to facilitate a user performing management and function configuration on the second electronic device;
    receiving, by the first server, configuration information from the first electronic device, wherein the configuration information comprises a configuration parameter obtained after the user performs management and function configuration on the second electronic device;
    sending, by the first server, the configuration information to the second server to facilitate the second server generating the DM service APP; and
    receiving, by the first server, the DM service APP from the second server.

8. The method according to claim 7, wherein accessing, the second server based on the identifier of the second electronic device further comprises:
    obtaining, by the first server, a device model of the second electronic device based on the identifier of the second electronic device; and
    accessing, by the first server, the second server based on the device model of the second electronic device to obtain the service policy for the second electronic device.

9. The method according to claim 5, wherein before sending the DM service APP to the first electronic device, the method further comprises:
    signing, by the first server, the DM service APP by using a private key of the first server; and
    encrypting, by the first server, the DM service APP by using an encryption key derived from a public key of the first electronic device.

10. An electronic device, comprising:
    a processor; and
    a memory;
    wherein the processor is coupled to the memory;
    wherein the memory is configured to store computer program code, wherein the computer program code comprises computer instructions; and
    wherein the processor is configured to execute the computer instructions to facilitate:
    sending, by the electronic device, a request message to a first server, wherein the request message comprises an identifier of a second electronic device, wherein the request message is for applying for deployment of a mobile device management (MDM) service, and wherein the MDM service is for management and device system upgrade of the second electronic device;
    receiving, by the electronic device, a device management (DM) service application (APP) from the first server, and installing the DM service APP, wherein after the DM service APP is installed, the electronic device is capable of providing the MDM service;
    establishing, by the electronic device, a wireless peer-to-peer (P2P) connection to the second electronic device, or accessing, by the electronic device, a same local area network as the second electronic device; and
    providing, by the electronic device, the MDM service for the second electronic device for management and device system upgrade of the second electronic device.

11. A server, comprising:
    a processor; and
    a memory;
    wherein the processor is coupled to the memory;
    wherein the memory is configured to store computer program code, wherein the computer program code comprises computer instructions; and
    wherein the processor is configured to execute the computer instructions to facilitate performance of the mobile device management method according to claim 5.

12. A non-transitory computer-readable storage medium having processor-executable instructions stored thereon, wherein the processor-executable instructions, when executed, facilitate performance of the mobile device management method according to claim 1.

* * * * *